United States Patent
Chen et al.

(10) Patent No.: US 11,962,668 B2
(45) Date of Patent: Apr. 16, 2024

(54) CACHING METHOD, DEVICE, AND COMPUTER PROGRAM PRODUCT FOR EDGE SERVER

(71) Applicant: Dell Products L.P., Round Rock, TX (US)

(72) Inventors: Si Chen, Shanghai (CN); Zijia Wang, WeiFang (CN); Zhenzhen Lin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/879,850

(22) Filed: Aug. 3, 2022

(65) Prior Publication Data

US 2024/0022644 A1 Jan. 18, 2024

(30) Foreign Application Priority Data

Jul. 14, 2022 (CN) .......................... 202210834681.6

(51) Int. Cl.
*H04L 67/5682* (2022.01)
*H04L 67/52* (2022.01)
*H04L 67/62* (2022.01)

(52) U.S. Cl.
CPC .......... *H04L 67/5682* (2022.05); *H04L 67/52* (2022.05); *H04L 67/62* (2022.05)

(58) Field of Classification Search
None
See application file for complete search history.

(56) References Cited

U.S. PATENT DOCUMENTS

| | | | | |
|---|---|---|---|---|
| 2019/0327328 | A1* | 10/2019 | Smith | H04L 12/141 |
| 2021/0306395 | A1* | 9/2021 | Mappus | H04L 65/1016 |
| 2021/0374523 | A1* | 12/2021 | Gottin | G06N 3/088 |
| 2022/0066932 | A1* | 3/2022 | Koch | G06F 12/0862 |
| 2022/0382800 | A1* | 12/2022 | Abraham | G06F 16/45 |

OTHER PUBLICATIONS

S. O. Somuyiwa et al., "A Reinforcement-Learning Approach to Proactive Caching in Wireless Networks," arXiv:1712.07084v1, Dec. 19, 2017, 31 pages.

* cited by examiner

*Primary Examiner* — Tonia L Dollinger
*Assistant Examiner* — Ishrat Rashid
(74) *Attorney, Agent, or Firm* — Ryan, Mason & Lewis, LLP (57) ABSTRACT

Embodiments of the present disclosure relate to a caching method, device, and computer program product for an edge server. The method includes acquiring a historical distribution of a set of variables associated with a network environment of the edge server, and generating one or more time series of the set of variables based on the historical distribution. The method further includes determining a caching strategy associated with the edge server based on the one or more time series of the set of variables. With the solution of the present disclosure, in an edge computing scenario, unnecessary overhead caused by ineffective caching can be reduced while ensuring smooth user experience.

20 Claims, 3 Drawing Sheets

CACHING METHOD, DEVICE, AND COMPUTER PROGRAM PRODUCT FOR EDGE SERVER

RELATED APPLICATION(S)

The present application claims priority to Chinese Patent Application No. 202210834681.6, filed Jul. 14, 2022, and entitled "Caching Method, Device, and Computer Program Product for Edge Server," which is incorporated by reference herein in its entirety.

FIELD

Embodiments of the present disclosure relate to computer networks, and in particular, to a caching method, device, and computer program product for an edge server.

BACKGROUND

With the rise of edge computing, end users or devices interact with services on edge servers rather than services in remote clouds or data centers. Such an interaction model achieves a lower latency, so that a higher level of Service Level Agreement (SLA) can be provided to improve user experience.

SUMMARY

Embodiments of the present disclosure provide a caching solution for an edge server.

In a first aspect of the present disclosure, a caching method for an edge server is provided, including: acquiring a historical distribution of a set of variables associated with a network environment of the edge server; generating one or more time series of the set of variables based on the historical distribution; and determining a caching strategy associated with the edge server based on the one or more time series of the set of variables, the caching strategy being configured to determine, based on values of the set of variables at a certain time and values of a set of states associated with the edge server at the time, a change to a cache of the edge server that should occur at the time and is related to online content, wherein the online content is associated with one or more user devices, and the one or more user devices are located within a service area of the edge server at the time.

In a second aspect of the present disclosure, an electronic device is provided. The electronic device includes a processor and a memory that is coupled to the processor and has instructions stored therein. The instructions, when executed by the processor, cause the device to execute actions including: acquiring a historical distribution of a set of variables associated with a network environment of an edge server; generating one or more time series of the set of variables based on the historical distribution; and determining a caching strategy associated with the edge server based on the one or more time series of the set of variables, the caching strategy being configured to determine, based on values of the set of variables at a certain time and a state of a cache of the edge server at the time, a change to the cache that should occur at the time and is related to online content, wherein the online content is associated with one or more user devices, and the one or more user devices are located within a service area of the edge server at the time.

In a third aspect of the present disclosure, a computer program product is provided. The computer program product is tangibly stored on a non-transitory computer-readable medium and includes machine-executable instructions. The machine-executable instructions, when executed by a machine, cause the machine to execute the method according to the first aspect of the present disclosure.

This Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent, in which.

Throughout the drawings, the same or similar reference numerals represent the same or similar elements.

DETAILED DESCRIPTION

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

With the rise of edge computing, end users or devices interact with services on edge servers rather than services in remote clouds or data centers. However, since the edge servers are widely distributed, and the end users or devices will usually interact with end servers that are closer to those end users or devices, the mobility of users or devices will result in switching of connections between the users and the edge servers, which brings challenges to data transmission, service continuity, and SLA.

Taking watching online videos as an example, the edge servers act as a middle layer or cache layer, acquire content data from content providers in clouds or data centers, and then provide data services to connected users. Conventionally, the edge servers can use reactive content loading, that is, the edge servers acquire, only after receiving requests for content data from users, the requested data from content providers. However, the reactive content loading will bring a latency and accordingly has a limitation in meeting requirements of SLA. These issues are especially prominent in scenarios with mobile devices switching between the edge servers. Some edge servers use active content loading to reduce the latency, that is, they acquire data associated with a user device from a content provider before the user device requests the data. However, due to the difficulty of predicting what content the user device will request, and a next edge server to which a connection will be switched when the user device moves, the simple active content loading may result in duplicate transmission of cached data and content data with low hit rates to a plurality of potential edge servers (e.g., when the user device is located in an overlapping region of coverages of service areas of a plurality of edge servers) and additional storage and network costs.

To at least partially address the above and other potential problems, embodiments of the present disclosure provide a caching solution for an edge server. Based on reinforcement learning, the solution explores a network environment where the edge server is located, so as to provide and improve a caching strategy adapted to the network environment where the edge server is located. Embodiments of this solution may determine one or more time series that characterize a change of an environment where the edge server is located based on historical data associated with the edge server (e.g., instant state of online content associated with a user device within a service area, network connection quality, and the like). Then, starting from an initial caching strategy (such as a random strategy), embodiments of the solution may determine, based on the time series of the change of the environment and the caching strategy at that time, caching actions that the edge server should make at a certain point in time corresponding to the time series of the change of the environment. Based on this determination, a series of states of the edge server may be updated accordingly, so that a time series of these caching actions and a time series of the states are obtained, and the time series of the states may characterize a state change made by the edge server using the caching strategy in the environment. In this process, based on the time series of various actions and states, the caching strategy can be adjusted when appropriate so as to obtain an optimized caching strategy. Some embodiments of the present disclosure may also continuously learn to enhance the strategy during application of the caching strategy.

With the solution of the present disclosure, in an edge computing scenario, unnecessary overhead caused by ineffective caching can be reduced while ensuring smooth user experience. For example, when applied to a Multi-access Edge Computing (MEC) scenario with a plurality of edge servers, by utilizing this solution, the plurality of edge servers can learn an optimized active caching strategy based on an environment. Thus, when a user device moves in the environment, a target edge server to which a connection of the user device will be switched will most likely actively acquire and cache online content that the user device may request.

Figure 1:
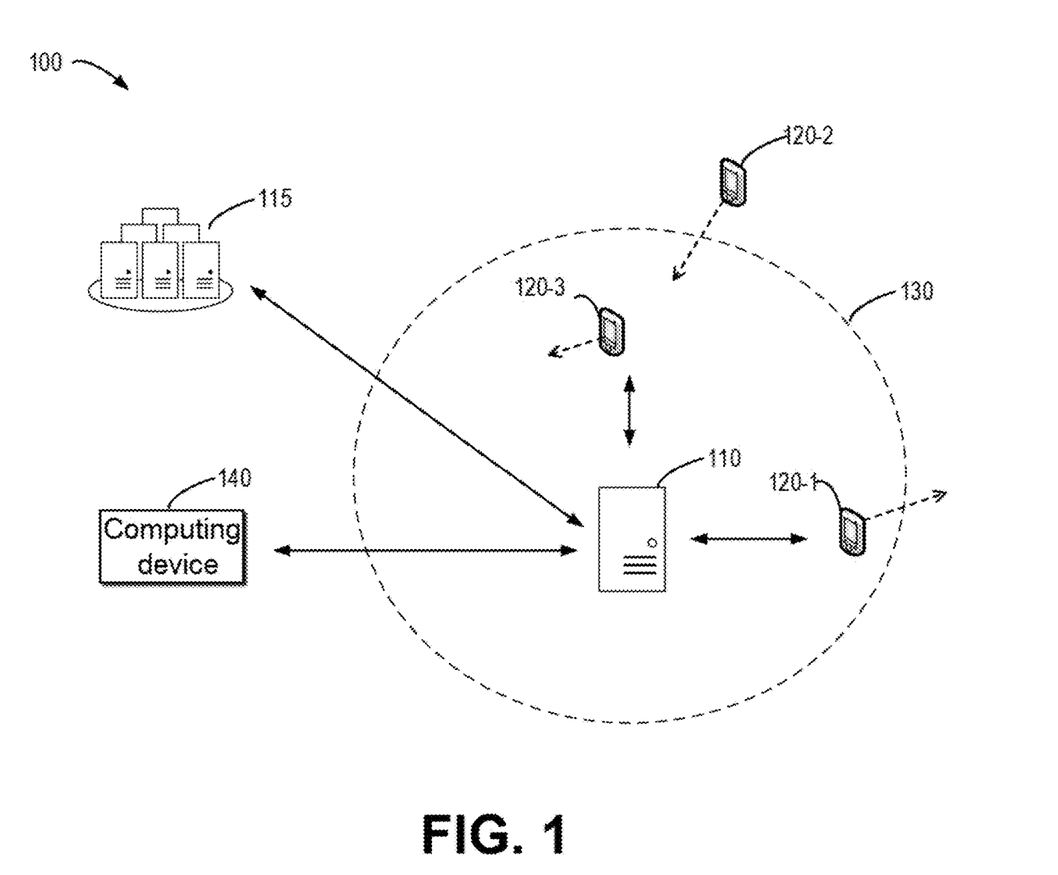
FIG. 1 illustrates a schematic diagram of an example environment in which a plurality of embodiments of the present disclosure can be implemented.

FIG. 1 illustrates a schematic diagram of example environment 100 in which a plurality of embodiments of the present disclosure can be implemented. Environment 100 includes edge server 110. Edge server 110 may acquire online content (e.g., online video and live chat) from content provider 115 (such as a cloud provider), load the acquired online content into its cache, and/or transmit it to a user device 120 that requests the online content through the edge server 110. Edge server 110 may also perform cache management to remove cached content from its cache. Edge server 110 covers service area 130 indicated by a dotted box. The user device 120 located within service area 130 may be connected to edge server 110 and request online content through edge server 110.

Environment 100 includes a plurality of user devices 120-1 to 120-3 (collectively or individually referred to as user device 120). User device 120 may be a personal computer, a smart phone, a laptop, a tablet, a game console, a wearable device, and/or any other mobile or non-mobile device. User device 120 may be moved in environment 100. For example, user device 120 may be moved from the inside of service area 130 of edge server 110 to the outside of service area 130 (as shown by user device 120-1), user device 120 may enter service area 130 (as shown by user device 120-2), and user device 120 may be moved within service area 130 (as shown by user device 120-3). The user device 120 may also request online content (e.g., from the content provider 115) via edge server 110 when located within service area 130. It should be understood that although only three user devices 120 are shown in FIG. 1 for illustration, there may be more or fewer user devices in environment 100.

Although only one edge server is shown in FIG. 1 for clarity of illustration, it should be understood that environment 100 may have a plurality of other edge servers that are not shown, with each such other server having its own service area, and these service areas may be overlapped. Each user device 120 may enter or leave the service area of the edge server and request online content via one of a number of available edge servers.

FIG. 1 also illustrates computing device 140. Computing device 140 may record or acquire historical data about environment 100 in various ways, for example, it may record or acquire network environment data associated with edge server 110. The network environment data may include a network connection state associated with edge server 110 at a certain point in time, various states of one or more user devices 120 within service area 130 at that time, and the like. Computing device 140 may also control a caching strategy of an edge server (e.g., edge server 110) in environment 100, for example, by using a method of the present disclosure. Although computing device 140 is shown as a single entity for the purpose of illustration, computing device 140 may be present and distributed in any suitable form. The scope of the present disclosure is not limited thereto. For example, computing device 140 may be the same device as edge server 110, content provider 115, or any of other edge servers or content providers not shown in environment 100, or be a part of any of them. Computing device 140 may also be any other single or distributed physical or virtual device having appropriate computing capability.

The architecture and functions of example environment 100 are described for illustrative purposes only, and do not imply any limitation to the scope of the present disclosure. There may also be other devices, systems, or components that are not shown in environment 100. Furthermore, embodiments of the present disclosure may also be applied to other environments having different structures and/or functions.

Figure 2:
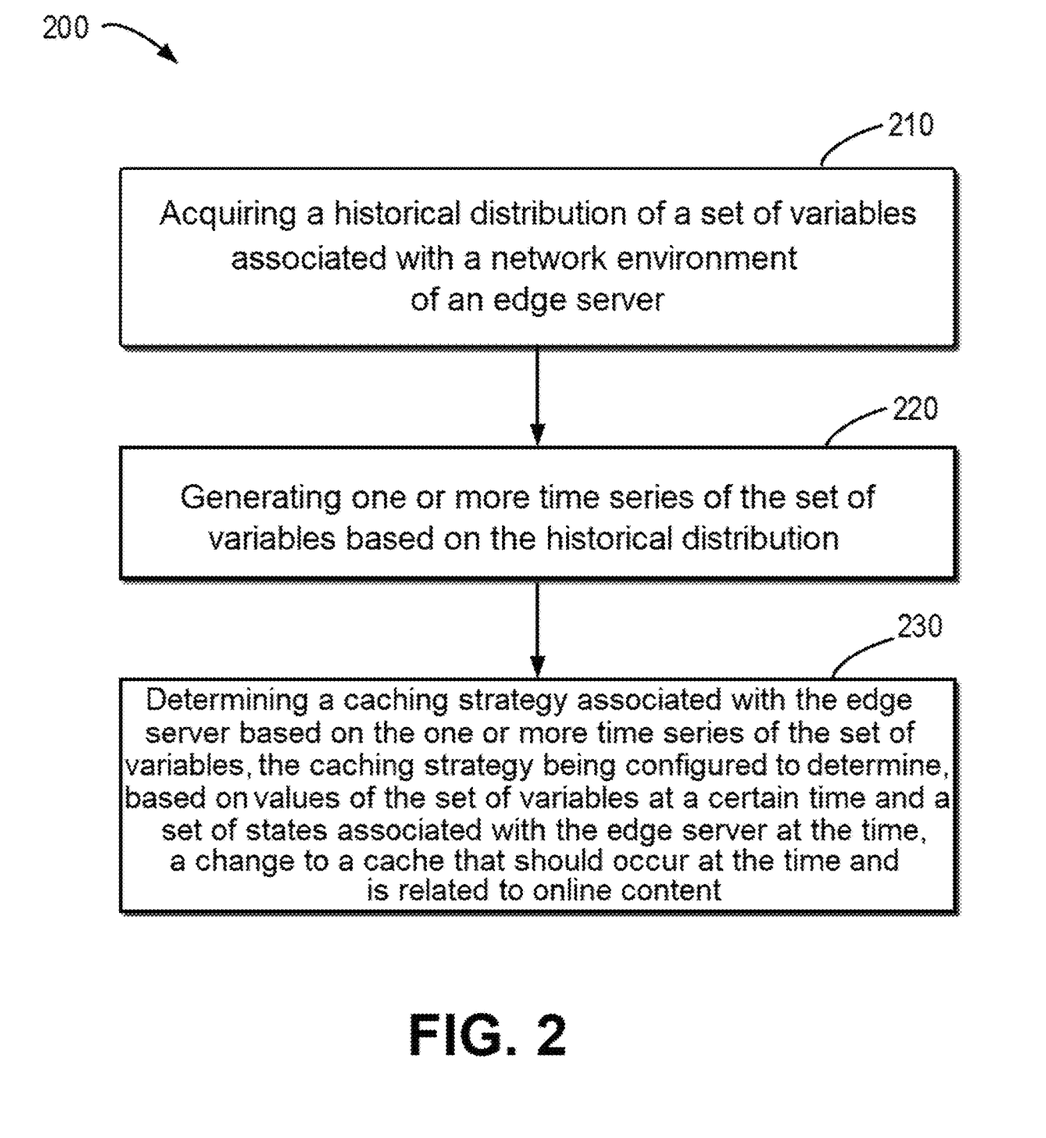
FIG. 2 illustrates an example caching method for an edge server according to some embodiments of the present disclosure.

FIG. 2 illustrates a flow chart of example caching method 200 for an edge server according to some embodiments of the present disclosure. For example, example method 200 may be performed by computing device 140 shown in FIG.

1. It should be understood that method 200 may also include additional actions not shown, and the scope of the present disclosure is not limited in this regard. Method 200 is described in detail below in conjunction with example environment 100 of FIG. 1.

At block 210, a historical distribution of a set of variables associated with a network environment of the edge server is acquired. For example, computing device 140 may acquire a historical distribution of a set of variables associated with a network environment of edge server 110. The set of variables reflect various external conditions that are not controlled by edge server 110 in the network environment. For example, the set of variables may include variables reflecting network quality (e.g., currently available bandwidth) at a certain time (e.g., within a certain time slot), variables reflecting states of one or more user devices 120 within service area 130 of edge server 110 (e.g., state of online content that is currently present and associated with each user device), and the like. Correspondingly, the historical distribution of the set of variables may reflect characteristics of a change of the network environment where the edge server 110 is located. Values of the variables may be in the form of numerical values, arrays, vectors, or other suitable forms, as well as combinations of these forms. The scope of the present disclosure is not limited thereto.

In some embodiments, computing device 140 may acquire the historical distribution of the set of variables based on historical data associated with the edge server. For example, computing device 140 may acquire a historical time series of the set of variables as a representation of its historical distribution. For example, computing device 140 may apply a model fitting method to the historical data to construct the historical distribution of the variables. In some other embodiments, computing device 140 may acquire (e.g., receive) a model representation (e.g., determined based on historical records, reports, or other documents) that reflects statistical properties of a set of variables in a network environment as the historical distribution.

In some embodiments, computing device 140 may acquire an independent distribution for each variable in a set of variables. In some embodiments, computing device 140 may acquire a joint distribution of a set of variables. In some other examples, computing device 140 may acquire a combination of respective independent distributions for a part of variables in a set of variables and a joint distribution of one or more related variables.

At block 220, one or more time series of the set of variables are generated based on the historical distribution. For example, computing device 140 may generate one or more time series of the set of variables based on the historical distribution of the set of variables associated with the network environment of edge server 110. Such time series can represent a change consistent with change characteristics of the network environment. In some embodiments, computing device 140 may generate the one or more time series by selecting the historical time series acquired at block 210 or a part thereof. In some other embodiments, computing device 140 may generate a set of sample time series consistent with model characteristics (e.g., by sampling a probability distribution multiple times) based on a constructed or acquired model representation of the historical distribution.

At block 230, a caching strategy associated with the edge server is determined based on the one or more time series of the set of variables. For example, computing device 140 may determine a caching strategy associated with edge server 110 based on the one or more time series generated at block 220.

The caching strategy is configured to, based on values of the set of variables at a certain time and a set of states associated with the edge server at that time (e.g., cached online content in a cache of the edge server, usage rate of the cache, and the like), determine a change to the cache that should occur at that time and is related to the online content associated with one or more user devices within the service area of the edge server (e.g., service area 130 of edge server 110) at the time.

In some embodiments, it is determined that the change includes first online content and second online content of the online content that should change. The first online content should be acquired by the edge server (e.g., from a server of a content provider) and loaded into the cache at the time, and the second online content has been loaded into the cache and should be removed from the cache at that time. It should be understood that at some times, the first online content and the second online content may be determined as null based on the caching strategy. In some embodiments, computing device 140 may apply a reinforcement learning method (for example, but not limited to, the Monte Carlo method, temporal difference learning, and the like) to the acquired one or more time series that represent the network environment as described above to determine a caching strategy that adapts to the environment where the edge server is located. The determination of the caching strategy will be described in more detail below in conjunction with FIG. 3.

By method 200, computing device 140 can determine a caching strategy by exploring a network environment where edge server 110 is located, without learning other knowledge such as the impact of caching actions in advance.

In some embodiments, the set of variables associated with the network environment of edge server 110 may include variables indicating the state of online content associated with one or more user devices located within service area 130. Furthermore, a time series of the set of variables can reflect a dynamic change of behaviors of the user devices. In some such embodiments, the set of variables may include online content at a corresponding point in time, and third online content is being requested by one or more user devices in the online content.

In such embodiments, each content item in the online content may be characterized by at least a type (e.g., the type that identifies whether the content item is video, audio, or text or the classification type based on a session, application, or other appropriate criteria) and remaining lifetime of the corresponding content item (e.g., equal-sized content blocks into which the content is divided, or items in other forms). In some embodiments, computing device 140 may encode the type of the content item as a multi-dimensional embedded vector and connect it to a value or vector representation of the remaining lifetime of the content item to form a semantic embedding that is adaptable to machine processing and characterizes the content item, which is further used by computing device 140 in this solution.

In some such embodiments, computing device 140 may utilize a positional encoding technique to normalize the semantic embedding of each feature of the content item, including the type and remaining lifetime, so that an embedding vector for each feature has the same length. A semantic representation of the content item encoded in this way can avoid the loss of feature information representing smaller features in subsequent processing due to different sizes of representations of various features.

In some embodiments, computing device 140 may generate one or more time series (hereinafter referred to as action time series) of a change (i.e., caching actions) to the cache of edge server 110, and one or more time series (hereinafter referred to as state time series) of a set of states associated with edge server 110 based on an initial strategy (e.g., a random strategy and a previously used historical strategy) and one or more time series (hereafter referred to as environmental time series) of a set of variables that describes the network environment. The computing device can then adjust the initial strategy based on the time series of the network environment and the generated time series to determine the caching strategy. In some embodiments, when computing device 140 determines the caching strategy, a process of determining caching actions (i.e., how should the cache change) at a certain time may be considered as a Markov decision process.

As the impact of caching actions is initially unknown, computing device 140 may simulate the caching actions and state changes of the edge server since the initial strategy is used, and adjust the initial strategy based on the simulation. Specifically, for each time step in the environmental time series, computing device 140 determines caching actions for the time step based on values of a set of variables and a current strategy at the time step, and updates various states of the environment and the cache server correspondingly. Then, computing device 140 in an updated state can iteratively perform a simulation for the next time step. In this way, computing device 140 may generate the action time series and the state time series associated with edge server 110.

Figure 3:
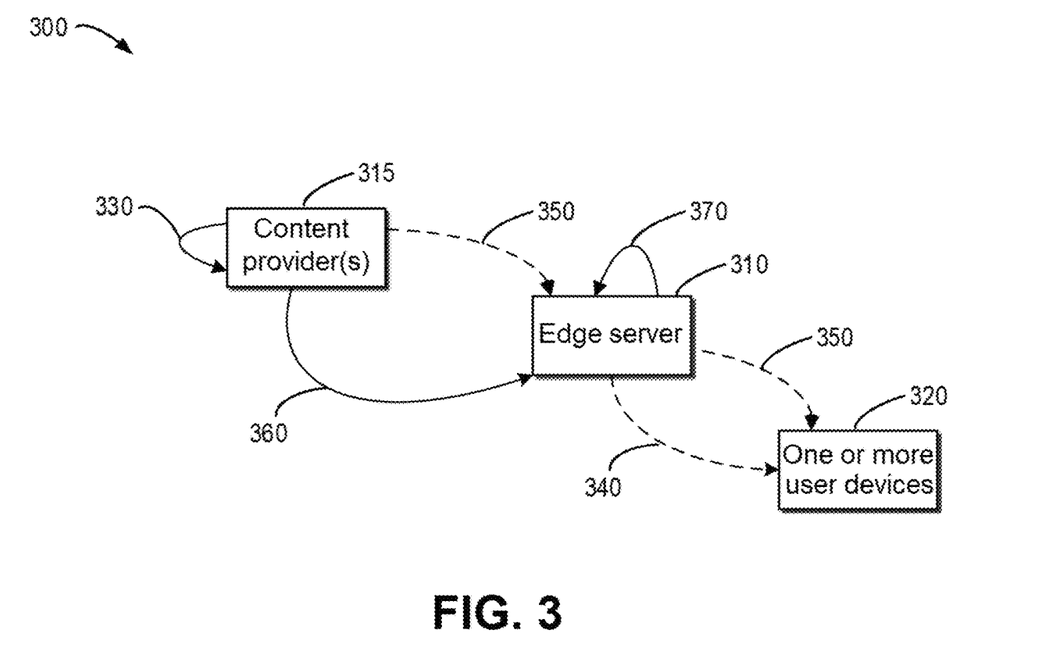
FIG. 3 illustrates a schematic data flow diagram associated with an edge server at a certain time according to some embodiments of the present disclosure.

FIG. 3 illustrates schematic data flow diagram 300 according to some embodiments of the present disclosure. Diagram 300 illustrates a flow of online content generated as a result of actions associated with edge server 310 with respect to online content at a certain time (e.g., at a time step with a predetermined duration). Edge server 310 may be an example of edge server 110 in FIG. 1.

As indicated by arrow 330, due to online activities (e.g., watching videos and online meetings) of one or more user devices 320 located within the service area of edge server 310, at content provider(s) 315, online content associated with a user device of the one or more user devices 320 is generated at this time. Content items of the content have respective types and lifetimes (e.g., duration of existence or association period with one or more user devices 320). Moreover, some other online content is no longer relevant to one or more user devices 320 due to expiration of its lifetime (no longer exists, or its association period with a user device ends for other reasons).

Furthermore, at the time, a user device in the one or more user devices 320 has a certain probability of requesting associated online content via edge server 310. In a case where a request occurs, the part of the requested content that has been cached by edge server 310 is downloaded to the corresponding user device that sends the request, as indicated by arrow 340. Further, the uncached part of the requested content may be acquired by the edge server 310 from the content provider(s) 315 and sent to the corresponding user device that sends the request, as indicated by arrows 350. In addition, regardless of whether a request occurs or not, as indicated by arrow 360, edge server 310 may actively acquire some online content that has not been requested and load the content into its cache according to the current caching strategy, environmental conditions, and the state of edge server 310. Also, as indicated by arrow 370, the edge server will also clean the cache, and remove a part of the online content associated with one or more user devices 320 from the cache. It should be understood that the removal of online content may include reactive removal as well as active removal that occurs based on the caching strategy, environmental conditions, and the state of edge server 310. The reactive removal refers to deterministic removal that occurs due to the change in the network environment. For example, content items in the cache may be removed due to expiration of lifetimes, the fact that they have been downloaded by an associated user device, or the like. It should be understood that, at this time, the edge server may also have additional actions not shown in FIG. 3 and corresponding additional states without departing from the scope of the present disclosure.

In some embodiments, computing device 140 may utilize the environmental time series to simulate various actions that produce flows in data flow diagram 300 and corresponding state changes, to generate the time series used for determining the caching strategy.

In some embodiments, computing device 140 adjusts the initial strategy for the purpose of maximizing the benefit from the caching strategy. In some such embodiments, a set of variables may include an instant unit resource consumption for edge server 110 to acquire a unit of online content (e.g., an instant unit download power consumption associated with instant network quality). Then, computing device 140 may adjust the caching strategy in a manner that minimizes a cumulative resource consumption (i.e., the sum of resource consumptions over time) for edge server 110 to acquire online content associated with a user device located within service area 130. Computing device 140 may also consider other resource consumptions associated with the online content, for example, energy consumption and space usage for content storage.

In some embodiments, computing device 140 may also adjust the initial strategy in a manner that minimizes a latency (e.g., an average latency over time) for one or more user devices to request online content via edge server 110. In some other embodiments, computing device 140 may also determine a reward function based on more than one of the factors described above, and adjust the initial strategy in a manner that maximizes the reward.

Depending on the reinforcement learning method of a specific application, starting from the initial strategy, computing device 140 may adjust the caching strategy after each update of states or after each of a plurality of time series of states is generated. Furthermore, computing device 140 may adjust the caching strategy until the strategy benefit can no longer be improved based on the current situation.

By evaluating cumulative benefits of various caching actions made by edge server 110 according to the environment to determine the caching strategy, computing device 140 may determine, without learning in advance the benefits that the caching actions (e.g., for meeting SLA) of the edge server can generate, an optimized caching strategy adapted to the network environment by exploring the environment where the edge server is located, so that higher benefits, for example, less resource consumption and/or less latency, can be achieved when the caching strategy is applied on the edge server.

In some embodiments, computing device 140 may further adjust the caching strategy according to the actual use of the caching strategy of the edge server determined by the method of the present disclosure (e.g., method 200) on the edge server. In some embodiments, for example, within each time slot with a predetermined duration, in response to a user device being located within service area 130 of edge server 110, based on current values of a set of variables of the network environment and current values of the set of states, and according to the current caching strategy, computing device 140 may perform the following operations: acquiring, by edge server 110, a first part of the online content associated with the user device, loading it into its cache, and removing a second part of the online content associated with the user device from the cache. It should be understood that, at some times, the first part and the second part may be determined as null according to the caching strategy at that time. After the operations described above are performed, a set of states of edge server 110 will change in response to these operations and other environmental conditions, and computing device 140 may then adjust the current caching strategy based on current values of the set of variables, the determined first and second parts, and an update of the set of states after the above operations. Thus, the caching strategy of the edge server can be continuously adjusted according to the network environment, so that the caching strategy matches the conditions of the environment where the edge server is located, that is, it is optimized for the current environmental conditions.

The solution of the present disclosure has good scalability, and it can be extended to an MEC scenario with a plurality of edge servers. By performing the method of the present disclosure with respect to a plurality of edge servers in an environment, and/or considering the total benefit of the plurality of edge servers when determining and adjusting the caching strategy (e.g., minimizing the total cumulative resource consumption of the plurality of edge servers), a caching strategy for the plurality of edge servers that is adapted to an MEC environment can be acquired. The solution of the present disclosure can also determine the optimized caching strategy of the edge server for a specific application or online content of a specific content provider.

Figure 4:
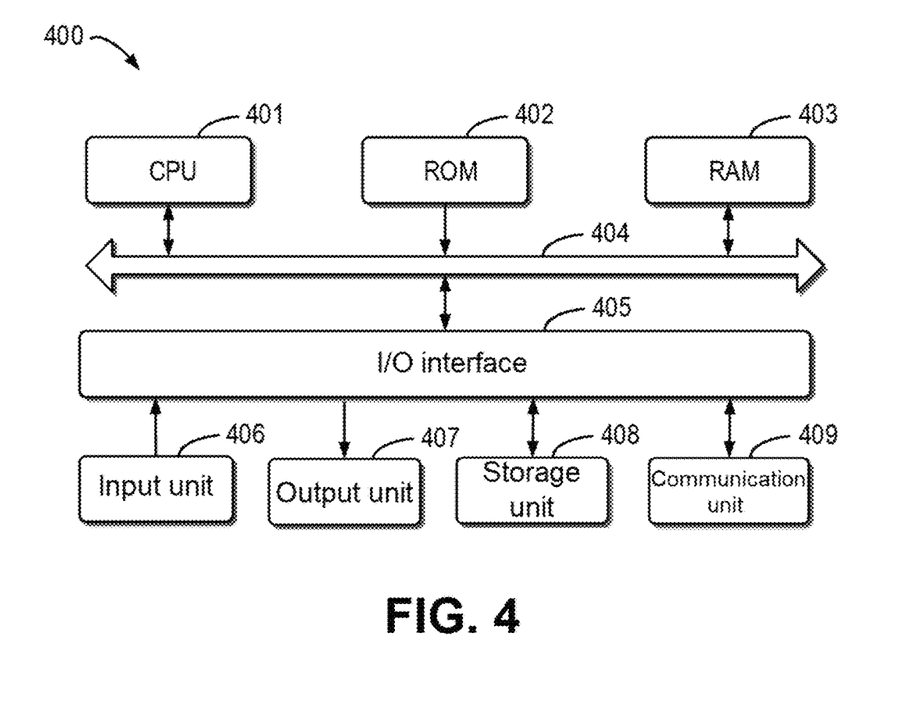
FIG. 4 illustrates a schematic block diagram of a device that can be used to implement embodiments of the present disclosure.

FIG. 4 illustrates a schematic block diagram of device 400 that may be used to implement embodiments of the present disclosure. Device 400 may be a device or apparatus as described in embodiments of the present disclosure, for example, computing device 140, edge server 110 or other edge servers, and content provider 115. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404. Although not shown in FIG. 4, device 400 may also include a co-processor.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices via a computer network, such as the Internet, and/or various telecommunication networks.

The various methods or processes described above may be performed by CPU 401. For example, in some embodiments, the method 200 may be embodied as a computer software program that is tangibly included in a machine-readable medium, such as storage unit 408. In some embodiments, part of or all the computer program may be loaded and/or installed onto device 400 via ROM 402 and/or communication unit 409. When the computer program is loaded into RAM 403 and executed by CPU 401, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A caching method for an edge server, comprising:
    acquiring a historical distribution of a set of variables associated with a network environment of the edge server;
    generating one or more time series of the set of variables based on the historical distribution; and
    determining a caching strategy associated with the edge server based on the one or more time series of the set of variables, the caching strategy being configured to:
    determine, based on values of the set of variables at a certain time and values of a set of states of the edge server at the time, a change to a cache of the edge server that should occur at the time and is related to online content, wherein the online content is associated with one or more user devices, and the one or more user devices are located within a service area of the edge server at the time;
    each of at least a subset of a plurality of content items of the online content being encoded as a combination of a first vector representing a type of the content item and a second vector representing a remaining lifetime of the content item to form a semantic embedding;
    the one or more time series of the set of variables characterizing at least movement of the one or more user devices within the network environment of the edge server, the network environment comprising a plurality of edge servers including a target edge server to which a connection of a given one of the user devices will be switched as the given user device moves within the network environment;
    wherein the caching strategy is determined in accordance with a reinforcement learning model in which the change to the cache comprises one of a plurality of actions of an action time series characterizing caching actions of the edge server, each of the actions of the action time series being selected based at least in part on (i) one or more states of a state time series characterizing corresponding states of the edge server, and (ii) a reward function of the reinforcement learning model.

2. The method according to claim 1, wherein determining the change comprises determining the following online content that should change:
    first online content of the online content, wherein the first online content should be acquired by the edge server and loaded into the cache at the time; and
    second online content of the online content, wherein the second online content has been loaded into the cache and should be removed from the cache at the time.

3. The method according to claim 1, wherein the set of variables comprises the online content and third online content being requested by the one or more user devices in the online content, and the method further comprises:
    for a content item in the online content, characterizing a corresponding content item by performing positional encoding on at least a type and a remaining lifetime of the corresponding content item.

4. The method according to claim 3, wherein determining the caching strategy comprises:
    generating one or more time series of the change to the cache and one or more time series of the set of states based on an initial strategy and the one or more time series of the set of variables; and adjusting the initial strategy based on the one or more time series of the set of variables, the one or more time series of the change, and the one or more time series of the set of states, to determine the caching strategy.

5. The method according to claim 4, wherein the set of variables comprises an instant unit resource consumption for the edge server to acquire the online content, and adjusting the initial strategy comprises:
adjusting the initial strategy in a manner that minimizes an accumulative resource consumption for the edge server to acquire online content associated with a user device located within the service area.

6. The method according to claim 4, wherein adjusting the initial strategy comprises:
adjusting the initial strategy in a manner that minimizes a latency of the one or more user devices requesting the online content via the edge server.

7. The method according to claim 1, further comprising:
in response to a user device being located within the service area, performing the following operations based on current values of the set of variables and current values of the set of states according to the caching strategy:
acquiring, by the edge server, a first part of online content associated with the user device, and loading it into the cache;
removing a second part of the online content associated with the user device from the cache; and
adjusting the caching strategy based on the current values of the set of variables, the first part, the second part, and an update of the set of states after the operations are performed.

8. An electronic device, comprising:
a processor; and
a memory coupled to the processor, wherein the memory has instructions stored therein which, when executed by the processor, cause the electronic device to execute actions comprising:
acquiring a historical distribution of a set of variables associated with a network environment of an edge server;
generating one or more time series of the set of variables based on the historical distribution; and
determining a caching strategy associated with the edge server based on the one or more time series of the set of variables, the caching strategy being configured to:
determine, based on values of the set of variables at a certain time and values of a set of states associated with the edge server at the time, a change to a cache of the edge server that should occur at the time and is related to online content, wherein the online content is associated with one or more user devices, and the one or more user devices are located within a service area of the edge server at the time;
each of at least a subset of a plurality of content items of the online content being encoded as a combination of a first vector representing a type of the content item and a second vector representing a remaining lifetime of the content item to form a semantic embedding;
the one or more time series of the set of variables characterizing at least movement of the one or more user devices within the network environment of the edge server, the network environment comprising a plurality of edge servers including a target edge server to which a connection of a given one of the user devices will be switched as the given user device moves within the network environment;

wherein the caching strategy is determined in accordance with a reinforcement learning model in which the change to the cache comprises one of a plurality of actions of an action time series characterizing caching actions of the edge server, each of the actions of the action time series being selected based at least in part on (i) one or more states of a state time series characterizing corresponding states of the edge server, and (ii) a reward function of the reinforcement learning model.

9. The electronic device according to claim 8, wherein determining the change comprises determining the following online content that should change:
first online content of the online content, wherein the first online content should be acquired by the edge server and loaded into the cache at the time; and
second online content of the online content, wherein the second online content has been loaded into the cache and should be removed from the cache at the time.

10. The electronic device according to claim 8, wherein the set of variables comprises the online content and third online content being requested by the one or more user devices in the online content, and the actions further comprise:
for a content item in the online content, characterizing a corresponding content item by performing positional encoding on at least a type and a remaining lifetime of the corresponding content item.

11. The electronic device according to claim 10, wherein determining the caching strategy comprises:
generating one or more time series of the change to the cache and one or more time series of the set of states based on an initial strategy and the one or more time series of the set of variables; and
adjusting the initial strategy based on the one or more time series of the set of variables, the one or more time series of the change, and the one or more time series of the set of states, to determine the caching strategy.

12. The electronic device according to claim 11, wherein the set of variables comprises an instant unit resource consumption for the edge server to acquire the online content, and adjusting the initial strategy comprises:
adjusting the initial strategy in a manner that minimizes an accumulative resource consumption for the edge server to acquire online content associated with a user device located within the service area.

13. The electronic device according to claim 11, wherein adjusting the initial strategy comprises:
adjusting the initial strategy in a manner that minimizes a latency of the one or more user devices requesting the online content via the edge server.

14. The electronic device according to claim 8, wherein the actions further comprise:
in response to a user device being located within the service area, performing the following operations based on current values of the set of variables and current values of the set of states according to the caching strategy:
acquiring, by the edge server, a first part of online content associated with the user device, and loading it into the cache;
removing a second part of the online content associated with the user device from the cache; and
adjusting the caching strategy based on the current values of the set of variables, the first part, the second part, and an update of the set of states after the operations are performed.

15. A computer program product tangibly stored on a non-transitory computer-readable medium and comprising machine-executable instructions, wherein the machine-executable instructions, when executed by a machine, cause the machine to perform a caching method for an edge server, the method comprising:
  acquiring a historical distribution of a set of variables associated with a network environment of the edge server;
  generating one or more time series of the set of variables based on the historical distribution; and
  determining a caching strategy associated with the edge server based on the one or more time series of the set of variables, the caching strategy being configured to:
  determine, based on values of the set of variables at a certain time and values of a set of states of the edge server at the time, a change to a cache of the edge server that should occur at the time and is related to online content, wherein the online content is associated with one or more user devices, and the one or more user devices are located within a service area of the edge server at the time;
  each of at least a subset of a plurality of content items of the online content being encoded as a combination of a first vector representing a type of the content item and a second vector representing a remaining lifetime of the content item to form a semantic embedding;
  the one or more time series of the set of variables characterizing at least movement of the one or more user devices within the network environment of the edge server, the network environment comprising a plurality of edge servers including a target edge server to which a connection of a given one of the user devices will be switched as the given user device moves within the network environment;
  wherein the caching strategy is determined in accordance with a reinforcement learning model in which the change to the cache comprises one of a plurality of actions of an action time series characterizing caching actions of the edge server, each of the actions of the action time series being selected based at least in part on (i) one or more states of a state time series characterizing corresponding states of the edge server, and (ii) a reward function of the reinforcement learning model.

16. The computer program product according to claim 15, wherein determining the change comprises determining the following online content that should change:
  first online content of the online content, wherein the first online content should be acquired by the edge server and loaded into the cache at the time; and
  second online content of the online content, wherein the second online content has been loaded into the cache and should be removed from the cache at the time.

17. The computer program product according to claim 15, wherein the set of variables comprises the online content and third online content being requested by the one or more user devices in the online content, and the method further comprises:
  for a content item in the online content, characterizing a corresponding content item by performing positional encoding on at least a type and a remaining lifetime of the corresponding content item.

18. The computer program product according to claim 17, wherein determining the caching strategy comprises:
  generating one or more time series of the change to the cache and one or more time series of the set of states based on an initial strategy and the one or more time series of the set of variables; and
  adjusting the initial strategy based on the one or more time series of the set of variables, the one or more time series of the change, and the one or more time series of the set of states, to determine the caching strategy.

19. The computer program product according to claim 18, wherein the set of variables comprises an instant unit resource consumption for the edge server to acquire the online content, and adjusting the initial strategy comprises:
  adjusting the initial strategy in a manner that minimizes an accumulative resource consumption for the edge server to acquire online content associated with a user device located within the service area.

20. The computer program product according to claim 18, wherein adjusting the initial strategy comprises:
  adjusting the initial strategy in a manner that minimizes a latency of the one or more user devices requesting the online content via the edge server.

* * * * *